US007656951B2

(12) United States Patent
Shin et al.

(10) Patent No.: US 7,656,951 B2
(45) Date of Patent: *Feb. 2, 2010

(54) DIGITAL VIDEO PROCESSING METHOD AND APPARATUS THEREOF

(75) Inventors: Hyun-doo Shin, Sungnam (KR); Yang-lim Choi, Paldal-gu (KR); B. S. Manjunath, Santa Barbara, CA (US); Xinding Sun, Santa Barbara, CA (US)

(73) Assignees: Samsung Electronics Co., Ltd., Suwon-si (KR); The Regents of the University of California, Oakland, CA (US)

( * ) Notice: Subject to any disclaimer, the term of this patent is extended or adjusted under 35 U.S.C. 154(b) by 1277 days.

This patent is subject to a terminal disclaimer.

(21) Appl. No.: 10/633,617

(22) Filed: Aug. 5, 2003

(65) Prior Publication Data

US 2004/0022314 A1   Feb. 5, 2004

Related U.S. Application Data

(62) Division of application No. 09/497,522, filed on Feb. 4, 2000, now Pat. No. 7,006,569.

(60) Provisional application No. 60/118,750, filed on Feb. 5, 1999.

(51) Int. Cl.
  *H04N 7/12* (2006.01)
  *H04B 1/66* (2006.01)

(52) U.S. Cl. .................................. 375/240.12

(58) Field of Classification Search ................ 375/240.02–240.25
See application file for complete search history.

(56) References Cited

U.S. PATENT DOCUMENTS

| 5,028,996 | A | * | 7/1991 | Takahashi et al. | ...... 375/240.24 |
| 5,193,001 | A | * | 3/1993 | Kerdranvrat | ................ 348/701 |
| 5,351,095 | A | * | 9/1994 | Kerdranvat | ................ 348/699 |
| 5,644,651 | A |   | 7/1997 | Cox et al. | |
| 5,767,922 | A | * | 6/1998 | Zabih et al. | ................ 348/700 |

(Continued)

FOREIGN PATENT DOCUMENTS

EP   0 383 269 A2   8/1990

(Continued)

OTHER PUBLICATIONS

Chinese Office Action dated Dec. 26, 2003.

(Continued)

*Primary Examiner*—Nhon T Diep
(74) *Attorney, Agent, or Firm*—Sughrue Mion, PLLC

(57) ABSTRACT

A digital video processing method and an apparatus thereof are provided. The method for processing digital images received in the form of compressed video streams comprising the step of determining a region intensity histogram (RIH) based on information on motion compensation of inter frames. The RIH information is obtained based on the motion compensation values of inter frames, and the RIH information is a good indicator of motion information of a video scene. Also, since the RIH information is quite a good indicator of intensity of the video scene, video streams having similar intensities can be effectively searched by searching for similar video scenes based on the RIH information obtained by the digital video processing method.

3 Claims, 2 Drawing Sheets

U.S. PATENT DOCUMENTS

| | | | |
|---|---|---|---|
| 5,956,026 A * | 9/1999 | Ratakonda | 715/723 |
| 6,025,886 A * | 2/2000 | Koda | 348/700 |
| 6,157,677 A * | 12/2000 | Martens et al. | 375/240.16 |
| 6,178,265 B1 * | 1/2001 | Haghighi | 382/236 |
| 6,252,975 B1 * | 6/2001 | Bozdagi et al. | 382/107 |
| 6,389,168 B2 * | 5/2002 | Altunbasak et al. | 382/224 |
| 6,389,417 B1 * | 5/2002 | Shin et al. | 707/6 |
| 6,456,660 B1 * | 9/2002 | Yokoyama | 375/240.16 |
| 6,462,768 B1 * | 10/2002 | Oakley | 348/31 |
| 6,597,738 B1 * | 7/2003 | Park et al. | 375/240.16 |
| 6,721,454 B1 * | 4/2004 | Qian et al. | 382/224 |
| 6,778,697 B1 * | 8/2004 | Shin et al. | 382/164 |

FOREIGN PATENT DOCUMENTS

| | | |
|---|---|---|
| EP | 0383269 A2 | 8/1990 |
| JP | 8-228356 | 9/1996 |
| JP | 8-320933 | 12/1996 |
| JP | 9-322173 A | 12/1997 |

OTHER PUBLICATIONS

Aghbari Z et al.; "A motion-location based indexing method for retrieving MPEG videos," Database and Expert Systems Applications, 1998. Proceedings. Ninth International Workshop in Vienna, Austria Aug. 26-28, 1998, Los Alamitos, CA, USA, IEEE Comput. Soc, US, Aug. 26, 1998, pp. 102-107.

Yining Deng et al.; "Content-based search of video using color, texture, and motion," Image Processing, 1997. Proceedings, International Conference, Santa Barbara, CA, USA Oct. 26-29, 1997, Los Alamitos, CA, USA, IEEE Comput. Soc., US, Oct. 26, 1997, pp. 534-537.

Takashi Satou, Yasuhiro Niikura, Yukinobu Tankgusyi, Akihito Akutsu, Yoshinobu Tonomira, An Efficient Method for Detecting Shot Boundaries and Telops in MPEG2 Video, Technical Report of IEICE, Nov. 22, 1996, pp. 47-54, vol. 96, No. 385, NTT Human Interface Laboratories, Kanagawa, Japan.

* cited by examiner

DIGITAL VIDEO PROCESSING METHOD AND APPARATUS THEREOF

REFERENCE TO RELATED APPLICATION

This is a divisional of application Ser. No. 09/497,522 filed Feb. 4, 2000 now U.S. Pat. No. 7,006,569, which claims benefit of Provisional Application No. 60/118,750 filed Feb. 5, 1999; the above noted prior applications are all hereby incorporated by reference.

BACKGROUND OF THE INVENTION

1. Field of the Invention

The present invention relates to a digital video processing method and apparatus thereof, and more particularly, to a digital video processing method and apparatus for classifying video scenes based on the motion information of a given scene.

Intensity of a video scene refers to the visual intensity experienced by a viewer when the viewer sees the video scene. This is an abstract concept indicating that the scene is very important in view of an overall video program. Thus, methods for searching video streams based on the intensity are required. However, as yet, there are no known methods for searching video streams based on the intensity nor methods for processing the same.

SUMMARY OF THE INVENTION

It is a first object of the present invention to provide a digital video processing method which allows for video search based on intensity.

It is a second object of the present invention to provide a computer readable medium for embodying the digital video processing method.

It is a third object of the present invention to provide a digital video processing apparatus for embodying the digital video processing method.

It is a fourth object of the present invention to provide a digital video analyzing method for comparing the intensities of video streams processed by the digital video processing method.

It is a fifth object of the present invention to provide a digital video searching method for searching video streams based on the intensities of video streams processed by the digital video processing method.

It is a sixth object of the present invention to provide a digital video search apparatus for embodying the digital video searching method.

To achieve the first object of the present invention, there is provided a method for processing digital images received in the form of compressed video streams comprising the step of (a) determining a region intensity histogram (RIH) based on information on motion compensation of inter frames.

Also, before the step (a), there may be further included the steps of (p-a) receiving video streams, (p-b) grouping the video streams into a plurality of groups using a predetermined algorithm, (p-c) selecting a group to be processed, wherein in the step (a), the RIH of the selected group is determined based on information on motion compensation of inter frames.

According to another aspect of the present invention, there is provided a method for processing digital images received in the form of compressed video streams including the step of (a) selecting an inter frame from the video streams, (b) with respect to the selected inter frame, calculating the ratio of the number of blocks whose motion compensation values are zero to the total number of macroblocks, (c) quantizing the ratio into i levels, where i is a predetermined positive number, (d) checking whether the processed inter frame is the last one, (e) if it is determined in the step-(d) that the processed inter frame is not the last one, selecting the next inter frame and performing the steps (b) through (d), (f) if it is determined in the step (d) that the processed inter frame is the last one, calculating the ratio of the number of inter frames in the ith level to the total number of inter frames in a given region, and (g) determining the ratio obtained in the step (f) as predetermined histogram information.

Also, the digital video processing method may further include the steps of (p-a) receiving video streams, (p-b) grouping the video streams into a plurality of groups using a predetermined algorithm, (p-c) selecting a group to be processed, wherein in the step (a), an inter frame is selected from the video stream group selected in the step (p-c).

Preferably, after the step (g), there are further included the steps of (h) checking whether the selected group is the last one, (i) if it is determined in the step (h) that the selected group is not the last one, selecting the next group, and (j) performing the steps (a) through (h) with respect to the next group selected in the step (i).

Also, the predetermined algorithm is preferably a scene cut detection algorithm.

Preferably, the video streams are moving picture expert group (MPEG)-7 video streams.

Also, the predetermined histogram information is defined by a region intensity histogram (RIH) which indicates the intensity of a given video scene region.

According to another aspect of the present invention, there is provided a digital video processing method comprising the step of defining the distribution of blocks whose motion compensation values are zero as motion activity, with respect to inter frames.

To achieve the second object of the present invention, there is provided a computer readable medium having program codes executable by a computer to perform a digital video processing method comprising the steps of (a) selecting an inter frame from the video streams, (b) with respect to the selected inter frame, calculating the ratio of the number of blocks whose motion compensation values are zero to the total number of macroblocks, (c) quantizing the ratio into i levels, where i is a predetermined positive number, (d) checking whether the processed inter frame is the last one, (e) if it is determined in the step (d) that the processed inter frame is not the last one, selecting the next inter frame and performing the steps (b) through (d), (e if it is determined in the step (d) that the processed inter frame is the last one, calculating the ratio of the number of inter frames in the ith level to the total number of inter frames in a given region, and (g) determining the ratio obtained in the step (f as predetermined histogram information.

To achieve the third object of the present invention, there is provided a digital video processing apparatus including grouping means for grouping video streams using a predetermined algorithm, selecting a group to be processed, and selecting and outputting each inter frame from the selected group in sequence, ratio calculating means for calculating the ratio of the number of blocks whose motion compensation values are zero to the total number of macroblocks, with respect to the selected inter frame, quantizing means for quantizing the ratio into i levels, where i is a predetermined positive number, and outputting level indication signals which indicate the respective levels, and a region intensity histogram (RIH) calculating means for calculating the ratio of the number of inter frames in the ith level to the total number of inter frames in a region, and outputting the calculation result as RIH information.

To achieve the fourth object of the present invention, there is provided a digital video analyzing method comprising the step of calculating the difference between $RIH_1$ and $RIH_2$, which is denoted by Distance $(RIH_1, RIH_2)$, as represented by the following Expression:

$$\text{Distance}(RIH_1, RIH_2) = (RIH_1 - RIH_2)^T M^{-1}(RIH_1, RIH_2)$$

wherein, of two video streams in a given video scene, RIH information of the first video stream is $RIH_1$, RIH information of the second video stream is $RIH_2$, and M is a covariance matrix.

To achieve the fifth object of the present invention, there is provided a method for searching for a desired digital video scene in compressed video streams including the step of (a) receiving video streams, (b) grouping the video streams into a plurality of groups using a predetermined algorithm, (c) selecting a group to be processed, (d) determining a region intensity histogram (RIH) of the selected group based on information on motion compensation of inter frames in the selected group, (e) selecting a video scene to be searched, (f) retrieving RIH information of the selected video scene, and (g) searching regions having similar RIH information based on the retrieved RIH information, in each of the processed video streams.

To achieve the sixth object of the present invention, there is provided an apparatus for searching for a desired digital video scene in compressed video streams including grouping means for grouping input video streams into a plurality of groups using a predetermined algorithm, motion compensation information retrieving means for retrieving information on motion compensation of inter frames from a selected group and outputting processed video streams including the information as the RIH information of the selected group, and searching means for retrieving RIH information of a selected group to be searched and searching for regions having similar RIH information based on the retrieved RIH information.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Hereinafter, embodiments of the present invention will be described in detail with reference to the accompanying drawings.

Figure 1:
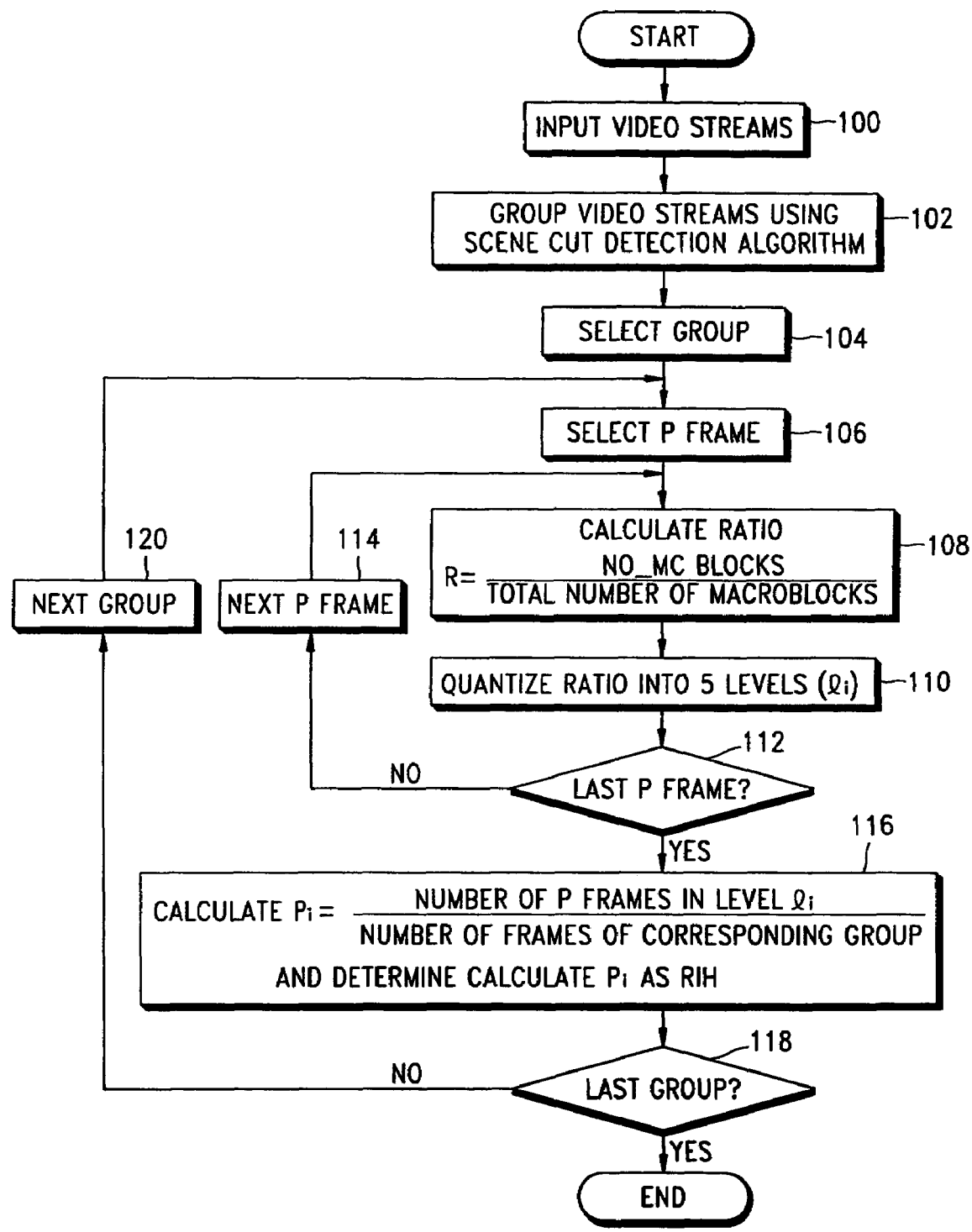
FIG. 1 is a flow diagram showing a digital video processing method according to the present invention.

In the present invention, in order to classify intensity of a video scene, motion information is used. Referring to FIG. 1, the digital video processing method according to the present invention includes the step of inputting video streams, preferably, MPEG-2 video streams, (step 100). Next, the video streams are grouped using a scene cut detection algorithm (step 102). Then, a group of video streams to be processed is selected (step 104). As known to one skilled in the art of MPEG, each of the video streams consists of a plurality of video frames. Video frames are classified as intra frames and inter frames. In the field of MPEG technology, the intra frames are generally referred to as I frames, and the inter frames include P frames and B frames. For convenience' sake of explanation, let B frames be P frames, then, the video frames are classified as I frames and P frames. In other words, the selected group of video streams consist of I frames and P frames.

Next, each P frame of the selected group of video streams is selected in sequence (step 106). Then, in step 108, with respect to the selected P frame, the ratio (R) of the number of blocks whose motion compensation values are zero to the total number of macroblocks is calculated, as expressed in Expression (1):

$$R = \frac{\text{Number of NO\_MC blocks}}{\text{Total number of macroblocks}} \quad (1)$$

wherein NO_MC blocks are blocks whose motion compensation values are zero, among macroblocks constituting the P frame. With respect to inter frames, the distribution of the blocks whose motion compensation values are zero is defined as motion activity.

Next, the ratio R is quantized into one of five levels $l_1, l_2, l_3, l_4$ and $l_5$. For example, the levels $l_1, l_2, l_3, l_4$ and $l_5$ refer to the cases where the ratios R are less than 5%, greater than or equal to 5% and less than 10%, greater than or equal to 10% and less than 30%, greater than or equal to 30% and less than 50%, and greater than or equal to 50%, respectively. In such a manner, processing of each P frame is completed.

Next, it is checked whether the processed P frame is the last one (step 112). If not, the next P frame is selected (step 114) and the steps 106 through 110 are performed until the last P frame is processed. Then, supposing i is an integer from 1 to 5, and the ratio of the number of P frames in the ith level ($l_i$) to the total number of P frames in a region is denoted by $P_i$, $P_i$ is calculated as follows:

$$P_i = \frac{\text{Number of } P \text{ frames in } l_i}{\text{Total number of } P \text{ frames in a region}} \quad (2)$$

to determine a region intensity histogram (RIH) as follows:

$$RIH = (P_1, P_2, P_3, P_4, P_5) \quad (3)$$

where the region denotes a selected group (step 116).

Then, it is checked whether the selected group is the last one (step 118). If not, the next group is selected (step 120) and the steps 106 through 116 are performed. In such a manner, the video processing for all groups is completed.

According to the digital video processing method, the RIH information is obtained based on the motion compensation values of P frames. The RIH information is a good indicator of the motion information of a video scene. Also, RIH information is quite a good indicator of the intensity of the video scene.

The digital video processing method is programmable by a computer. Codes and code segments constituting a computer program can be easily derived by a computer programmer in the art. Also, the program is stored in computer readable media and is read and executed by the computer, thereby embodying the digital video processing method. The media may include magnetic recording media, and optical recording media.

Figure 2:
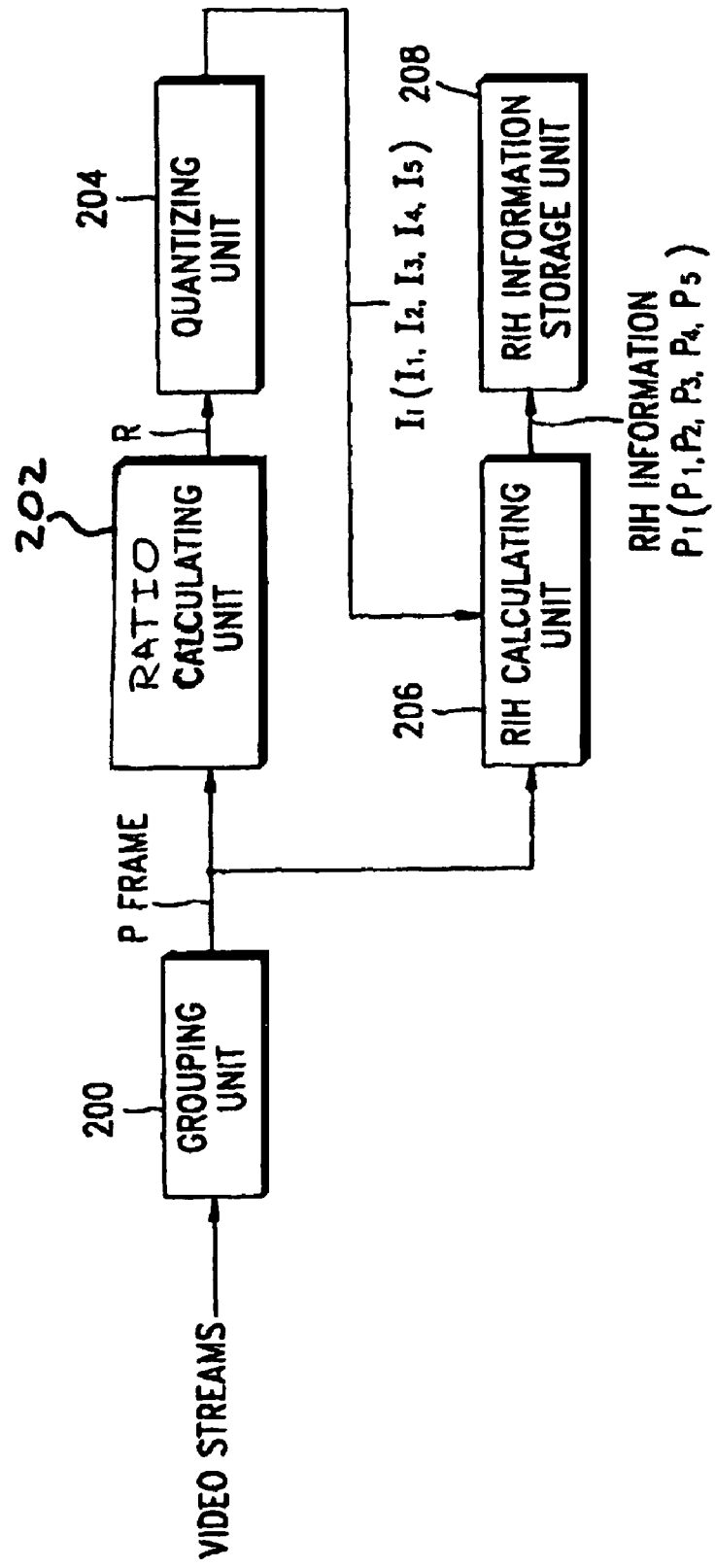
FIG. 2 is a block diagram of a digital video processing apparatus according to the present invention.

Also, the digital video processing method can be implemented on a digital video processing apparatus. FIG. 2 is a block diagram of the digital video processing apparatus according to the present invention. Referring to FIG. 2, the digital video processing apparatus includes a grouping unit 200, a NO_MC block ratio calculating unit 202, a quantizing unit 204, an RIH calculating unit 206, and an RIH information storage unit 208.

In the operation of the digital video processing apparatus, the grouping unit 200 groups video streams using a scene cut detection algorithm, selects a group to be processed, and selects and outputs each P frame from the selected group in sequence.

The NO_MC block ratio calculating unit 202 calculates the ratio of the number of blocks whose motion compensation values are zero to the total number of macroblocks, as defined in Expression (1) to output a ratio data R representing the calculated ratio.

The quantizing unit 204 quantizes the ratio R into one of five levels $l_1, l_2, l_3, l_4$ and $l_5$ to then output level indication signals $I_1, I_2, I_3, I_4$ and $I_5$, which indicate the respective levels. The respective levels $l_1, l_2, l_3, l_4$ and $l_5$ are for the cases where the ratios R are less than 5%, greater than or equal to 5% and less than 10%, greater than or equal to 10% and less than 30%, greater than or equal to 30% and less than 50%, and greater than or equal to 50%, respectively. In such a manner, processing of each P frame is completed.

If processing of the last P frame is completed, the RIH calculating unit 206 calculates the ratio of the number of P frames in the ith level ($l_i$) to the total number of P frames in a region, which is denoted by $P_i$, as represented by Expression (2) to then output region intensity histogram (RIH) data, as represented by Expression (3).

The RIH information storage unit 208 receives the RIH information $(P_1, P_2, P_3, P_4, P_5)$ and stores the same therein. More preferably, the RIH information storage unit 208 receives video stream data, interleaves the RIH information with the video stream data and outputs RIH information interleaved video streams.

By the video streams processed by the digital video processing method shown in FIG. 1 and using the digital video processing apparatus shown in FIG. 2, the intensities of two arbitrary video streams can be compared and analyzed.

According to a digital video analyzing method of the present invention, the difference between $RIH_1$ and $RIH_2$, i.e., Distance $(RIH_1, RIH_2)$, is calculated as represented by Expression (4):

$$\text{Distance}(RIH_1, RIH_2) = (RIH_1 - RIH_2)^T M^{-1}(RIH_1, RIH_2) \quad (4)$$

wherein, of two video streams in a given video scene, RIH information of the first video stream is $RIH_1$, RIH information of the second video stream is $RIH_2$, and M is a covariance matrix.

The Distance $(RIH_1, RIH_2)$ calculated by the above-described digital video analyzing method is properly indicative of the difference in intensity between two video streams.

Using the video streams processed by the digital video processing method shown in FIG. 1, which is implemented on the digital video processing apparatus shown in FIG. 2, region searching can be effectively performed by a digital video searching method according to the present invention.

The digital video searching method according to the present invention is based on the assumption that the video streams are processed by the digital video processing method shown in FIG. 1. In other words, it should be understood that the digital video searching method according to the present invention encompasses the digital video processing method which has been described with reference to FIG. 1.

According to the digital video searching method of the present invention, the RIH information of a selected video scene, that is, a video region, is first obtained.

Next, with respect to the video streams processed by the digital video processing method shown in FIG. 1, regions having similar RIH information, that is, video scenes having similar intensity, are searched for based on the obtained RIH information.

Since the RIH information is determined based on motion compensation values of P frames, it is properly indicative of motion information of the video scene. Also, the distribution of blocks whose motion compensation values with respect to inter frames are zero, accounts for motion activity quite well. Further, in a video program, in particular, in a sports program, the motion information is very closely related to the content of the pertinent video stream. The RIH information which is based on motion information is quite a good indicator of the intensity of a video scene. In other words, the video streams of scenes having similar intensities can be effectively searched by searching for similar video scenes based on the RIH information.

The above-described digital video searching method can be applied to multi-media push/pull application fields such as content based video search engines.

Also, the digital video searching method is programmable by a computer program. Codes and code segments constituting a computer program can be easily derived by a computer programmer in the art. Also, the program is stored in computer readable media and is readable and executable by the computer, thereby embodying the digital video searching method. The media may include magnetic recording media, and optical recording media.

Also, the digital video processing method can be embodied on a digital video searching apparatus (not shown). The digital video searching apparatus according to the present invention includes a grouping unit, a motion compensation information retrieving unit, and a searching unit.

In the operation of the digital video searching apparatus, the grouping unit groups input video streams into a plurality of groups using a scene cut detection algorithm.

The motion compensation information retrieving unit extracts information on motion compensation of P frames from a selected group and outputs processed video streams including the information as the RIH information of the selected group.

The searching unit extracts RIH information of a selected group to be searched and searches for regions having similar RIH information based on the retrieved RIH information.

The aforementioned digital video searching apparatus can effectively search the video streams of scenes having similar intensities by searching for similar video scenes based on the RIH information.

As described above, according to the present invention, the RIH information is obtained based on the motion compensation values of inter frames, and the RIH information is a good indicator of motion information of a video scene. Also, since the RIH information is quite a good indicator of intensity of the video scene, video streams having similar intensities can be effectively searched by searching for similar video scenes based on the RIH information obtained by a digital video processing method of the present invention.

What is claimed is:

1. A method of processing image data, comprising:
   allotting motion intensity, by an allotting device, to each frame constituting the image data;
   expressing the image data by a ratio of the number of all frames constituting the image data to the number of frames having the allotted motion intensity, and
   storing the ratio in a storage.

2. A computer readable medium having encoded thereon program codes to be executed by a computer to implement a method for describing image data, comprising:
   allotting motion intensity to each frame constituting the image data; and
   expressing the image data by the ratio of the number of all frames constituting the image data to the number of frames having the allotted motion intensity.

3. An apparatus for describing image data, comprising:
   allotting means for allotting motion intensity to each frame constituting the image data; and
   expressing means for expressing the image data by the ratio of the number of all frames constituting the image data to the number of frames having the allotted motion intensity.

* * * * *

UNITED STATES PATENT AND TRADEMARK OFFICE
CERTIFICATE OF CORRECTION

PATENT NO.       : 7,656,951 B2
APPLICATION NO. : 10/633617
DATED            : February 2, 2010
INVENTOR(S)      : Shin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1946 days.

Signed and Sealed this

Twenty-eighth Day of December, 2010

David J. Kappos
*Director of the United States Patent and Trademark Office*